June 5, 1951 S. I. TOURSHOU ET AL 2,555,827
HIGH VOLTAGE POWER SUPPLY
Filed Oct. 26, 1948
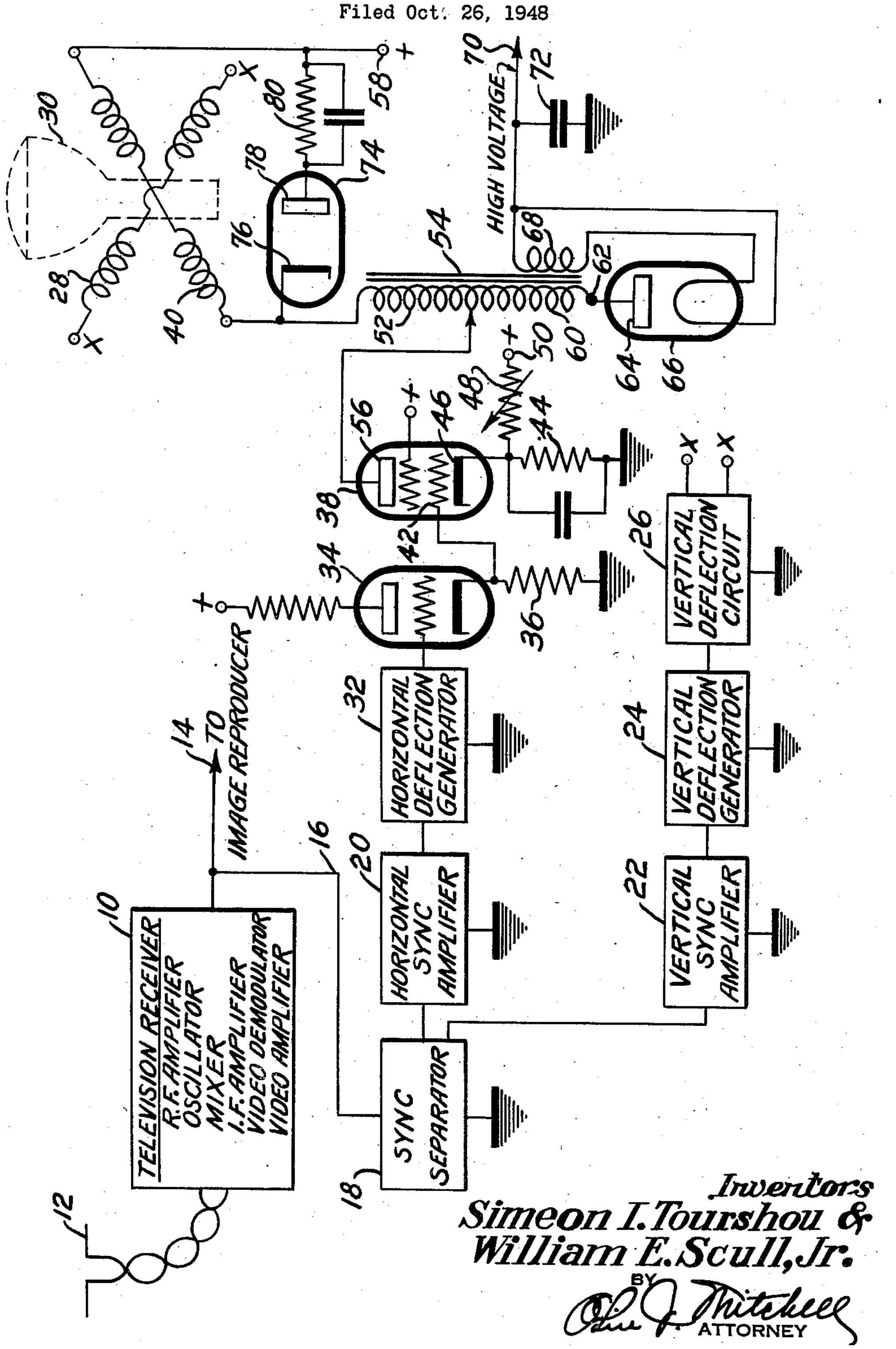
Inventors
Simeon I. Tourshou &
William E. Scull, Jr.
BY
ATTORNEY Patented June 5, 1951

2,555,827

UNITED STATES PATENT OFFICE 2,555,827

HIGH-VOLTAGE POWER SUPPLY

Simeon I. Tourshou, Philadelphia, Pa., and William E. Scull, Jr., Haddonfield, N. J., assignors to Radio Corporation of America, a corporation of Delaware

Application October 26, 1948, Serial No. 56,562

12 Claims. (Cl. 315—27)

The present invention relates to power supplies for electrical equipment and pertains more directly to power supplies of the pulse step-up variety commonly employed in the generation of relatively high unidirectional potentials.

In particularity, although not necessarily limited thereto, the present invention provides a power supply arrangement eminently applicable to the generation of a high voltage of an order suitable as an accelerating potential for cathode ray equipment as used in television systems and is of particular value in television receiving systems wherein the high voltage for the reproducing kinescope is to be derived from energy extracted from the kinescope circuits.

In the art to which this invention pertains, numerous pulse step-up type systems have been proposed and used in the production of high voltage power supplies. However, these proposed systems generally require apparatus which is relatively expensive and large in physical size. In the case of television combination deflection circuit and pulse step-up power supplies, undesirable restrictions are imposed on associated circuits by prior art high voltage systems.

Particularly in the case of television pulse step-up power supply systems receiving pulse energy from an auxiliary high impedance winding on the horizontal deflection signal output transformer, it is neccessary to employ a special form of output transformer which must be held to quite rigid manufacturing specifications with a consequent high production cost. Even at best, such a transformer introduces losses in the deflection system which are peculiar to the requirements of high voltage power supply function.

In a case where output transformer losses are successfully circumvented by direct connection of the electromagnetic yoke in the plate circuit of the horizontal ouput tube, it is apparent that the usual elements of a conventional pulse step-up system are lacking since no magnetic structure is provided on which to employ a high impedance pulse step-up winding. In such a successful "direct drive" system other means must be employed to extract the pulse waveform from the deflection circuit and apply the same to some step-up device followed by suitable rectification.

The present invention applied to television systems provides special advantages by inserting in series with a directly driven deflection yoke, the primary of a step-up transformer or autotransformer, the primary having such low impedance that normal deflection circuit action is substantially unchanged although permitting the current changes through said primary to induce high potential pulses in the transformer secondary which are in turn rectified to produce a unidirectional source of potential. Disadvantages of the systems discussed above are partly obviated by the arrangement of the invention as set forth.

It is therefore a purpose of the present invention to provide a simplified combination deflection circuit and high voltage power supply arrangement for television systems.

It is further an object of the present invention to provide a pulse step-up power supply system which is particularly applicable to electromagnetic direct drive deflection circuits wherein the deflection yoke is directly included in the plate circuit of the deflection signal output vacuum tube.

It is further an object of the present invention to provide a novel high voltage power supply system which produces high potentials from energy serially extracted from the input circuit of an electrical utilization means.

The novel features, which are believed to be characteristic of the present invention, are set forth with particularity in the appended claims. The invention itself, however, both to its organization and method of operation together with further objects and advantages thereof may be best understood by reference to the following description taken in connection with the accompanying drawing in which the single figure thereof shows application of the present invention to a typical television receiving circuit.

Referring to the drawing there is shown in block 10 an R. F. amplifier, an oscillator, mixer, intermediate frequency amplifier video demodulator and video amplifier which will be recognizable to those skilled in the communications art as being exemplary components of one form of television system. The television signal is intercepted by antenna 12 and after being translated through the television receiver components represented in block 10, produces a video signal at terminal 14 suitable for application to an image reproducing device. The composite video signal appearing at terminal 14 is conventionally applied through circuit path 16 to a sync separator circuit 18 which extracts from the composite video signal horizontal synchronizing information and vertical synchronizing information which are respectively applied to the horizontal and vertical sync amplifiers 20 and 22. The output of the vertical sync amplifier is then in turn applied to control the vertical deflection circuit represented by block 26. The output of the vertical deflection circuit available at terminals X—X is, of course, applicable to the vertical deflection coils 28 of an electromagnetic deflection yoke having vertical excitation terminals X—X shown adjacent the dotted line kinescope representation 30. It will be understood that terminal 14 is in communication with an appropriate terminal of the kinescope 30.

The output of the horizontal sync amplifier 20 is suitably and conventionally applied to time the action of a horizontal deflection signal generator such as 32, whose output is applied to drive a cathode follower type amplifier 34. The deflection signal then appearing across the cathode follower load resistance 36 provides a low impedance source of driving signal for the horizontal deflection output tube 38. The advantages to be derived from this particular low impedance driving arrangement for the horizontal output tube 38, having the horizontal deflection yoke winding 40 directly included in its anode circuit, is discussed at length in the U. S. Patent application Serial No. 26,965, by Hubert R. Shaw, filed May 14, 1948, entitled "Television Receiver Horizontal Deflection." As is shown in order to provide the necessary bias conditions on the output tube 38, which has its grid 42 directly connected to the cathode of the driver tube 34, a resistance 44 is connected in series with the cathode 46 and ground potential. The plate current characteristic over which the output tube 38 operates may then be adjusted by varying the rheostat 48 connected with a positive source of potential having a terminal at 50. Variation of this rheostat alters the current through resistor 44 and hence the voltage drop inserted in series with the cathode circuit of the output tube.

According to the present invention, the primary winding 52 of an autotransformer 54 is included in series with the connection from the anode 56 to the horizontal deflection winding 40 through which polarizing potential for the anode is applied from positive power supply terminal 58. Hence, the anode current transients of vacuum tube 38 resulting from the driving deflection signal will cause rapid flux changes in the autotransformer 54, which in turn induces high voltage impulses in the secondary winding 60 of the transformer. Provided the secondary winding 60 is properly proportioned relative to the primary winding 52, the high voltage impulses appearing at the secondary winding terminal 62 may be in the order of several thousand volts under normal operating conditions of the deflection output circuit. Accordingly, the anode 64 of a high voltage rectifier 66 may be connected with the secondary terminal 62, and heater energy for the rectifier derived from auxiliary winding 68, to provide pulsating unidirectional high voltage at terminal 70 of the system. To improve the regulation of the system and to filter out pulsations of the unidirectional potential so produced, a capacitor 72 may be connected from the output terminal 70 to ground potential. It is noted that damping of the horizontal deflection winding 40 is normally desirable and such damping may be conveniently accomplished as shown through the application of a diode 74 having its cathode 76 connected with one terminal of the deflection yoke 40 and its anode 78 connected through a damping load 80 to the other terminal of the deflection winding.

In the above embodiment although an autotransformer, purely by way of example, has been illustrated having an auxiliary winding 68 incorporated therein for the purpose of supplying high voltage rectifier heater energy, it is clear that the present invention is in no way limited thereby. Also, any low impedance transformer primary of suitably low value having associated therewith a properly insulated secondary winding of sufficient number of turns may be employed in lieu of the autotransformer shown. Such a transformer may or may not be connected for autotransformer operation. However, it can be appreciated that with such autotransformer connections an additional high voltage potential is made available at terminal 70 by an amount substantially equal to the low voltage potential maintained at terminal 58. Manifestly, the heater energy for the high voltage rectifier 66 may be supplied from other sources than that of the deflection circuit itself, however, by way of illustration, one very convenient and economical arrangement for driving heater energy has been shown as being supplied from an auxiliary winding on the high voltage transformer as above described.

The damping action supplied by the diode 74 and associated load 80, of course, may be supplied by other circuit means without departing from the scope of the present invention. For example, the cathode 76 may be connected to the anode 56 of the vacuum tube 38 as an alternative to the connection shown. With such latter arrangement, it is clear that damping current would be caused to flow through the primary 52 of the autotransformer 54.

From the foregoing, it can be seen that there is provided a novel, simple, and most effective high voltage power supply system which finds ready application to television receiving circuits employing electromagnetic deflection. The system requires a minimum number of components and provides adequate high voltage for application to cathode ray equipment accelerating terminals without demanding close tolerances in the characteristics of the electrical parameters employed.

What is claimed is:

1. In an electrical system incorporating utilization means requiring the application of alternating magnetic flux, an electromagnetic field generating means having actuating terminals therein for application of an alternating voltage suitable in establishing the required alternating magnetic field, an electromagnetic autotransformer having a primary winding section and a secondary winding section, said secondary winding section having an attached end and a free end, electrical connections between said transformer primary winding section, the terminals in said field generating means and a source of alternating voltage energy, said connections placing said transformer primary winding section in series with said field generating means and said source of alternating voltage such as to leave disconnected the free end of said autotransformer secondary winding, and alternating voltage rectifying means connected with the free end of said secondary winding section of said step-up transformer for developing a unidirectional voltage from energy derived therefrom.

2. A unidirectional high voltage power supply derived from an electromagnetic cathode ray tube beam deflection system employing a deflection yoke having a deflection winding thereon, said power supply comprising in combination an electromagnetic step-up transformer having a primary winding and a secondary winding, electrical connections including said primary winding in series with said deflection winding and a source of deflection energy, and an alternating voltage rectifying means connected with the secondary winding of said step-up transformer for developing a unidirectional voltage from energy derived therefrom.

3. A unidirectional high voltage power supply derived from electromagnetic cathode ray tube beam deflection system employing a deflection yoke having a deflection winding thereon, said power supply comprising in combination a current sensitive device productive of alternating voltage upon changes in the current passing therethrough said device having input terminals and output terminals, electrical connections including said current sensitive device input terminals in series with said deflection winding and alternating voltage rectifying means connected with the output terminals of said current sensitive means for developing a unidirectional voltage from energy derived therefrom.

4. A unidirectional high voltage power supply derived from an electromagnetic cathode ray tube beam deflection system employing a deflection yoke having a deflection winding thereon said power supply comprising in combination a pulse step up means having pulse input terminals and pulse output terminals, electrical connections placing said input terminals in series with said deflection winding, and rectifying means connected with said pulse step up means output terminals for developing a unidirectional voltage in accordance with the pulse amplitude applied thereto.

5. In a deflection system for a cathode ray type electron tube having associated therewith electromagnetic deflection means, said deflection means having actuating terminals for application of deflection energy, a unidirectional voltage generating circuit comprising in combination, an electromagnetic step-up transformer having a primary winding and a secondary winding, said transformer primary winding being connected in series with the deflection means actuating terminals and a source of deflection energy and alternating voltage rectifying means connected with the secondary winding of said step-up transformer for developing a unidirectional voltage from energy derived therefrom.

6. In a deflection system for a cathode ray type electron tube having associated therewith electromagnetic deflection means, said deflection means having actuating terminals for application of deflection energy, a unidirectional voltage generating circuit comprising in combination, an electromagnetic auto transformer having a primary winding and a secondary winding, said transformer primary winding being connected in series with the deflection means actuating terminals and a source of deflection energy and alternating voltage rectifying means connected with the secondary winding of said step-up transformer for developing a unidirectional voltage from energy derived therefrom.

7. A unidirectional high voltage cathode ray tube power supply for a television receiver, said receiver having an electromagnetic deflection system for connection with a deflection yoke having an actuating winding associated with said cathode ray tube, said high voltage power supply comprising in combination, an electromagnetic step-up transformer having a primary winding and a secondary winding, electrical connections including said primary winding in series with the actuating winding of said deflection yoke and alternating voltage rectifying means connected with the secondary winding of said step-up transformer for developing a unidirectional voltage from energy derived therefrom.

8. In a television receiver obtaining kinescope beam deflection by means of a varying electrical current passing through an electromagnetic deflection yoke, a current sensitive alternating voltage generating device connected with said deflection yoke to respond to current changes in said yoke, and a rectifying means connected with the output of said current sensitive device for producing a unidirectional voltage from energy derived therefrom.

9. In a television receiver employing electromagnetic deflection and a deflection yoke therefor, the deflection yoke being directly driven by direct inclusion of the yoke deflection winding in the anode circuit of a suitably excited vacuum tube, a unidirectional voltage generating circuit including in combination, an electromagnetic step-up auto transformer having a primary winding and a secondary winding, an electrical connection from the vacuum tube anode to one terminal on the transformer primary winding, a connection from another primary winding terminal to a point on the yoke deflection winding, a connection from a source of anode polarizing potential to a different point on said yoke deflection winding and alternating voltage rectifying means connected with the secondary winding of said step-up transformer for developing a unidirectional voltage from energy derived therefrom.

10. In a television receiver employing electromagnetic deflection and a deflection yoke therefor, the deflection yoke being directly driven by direct inclusion of the yoke deflection winding in the anode circuit of a suitably excited vacuum tube, a unidirectional voltage generating circuit including in combination, an electromagnetic step-up auto transformer having a primary winding and a secondary winding, electrical connections placing said primary winding in series with said yoke winding to a source of vacuum tube anode polarizing potential, an electrical connection from the vacuum tube anode to one terminal on the transformer primary winding, a connection from another primary winding terminal to the yoke deflection winding, a connection from a source of anode polarizing potential to said yoke deflection winding, a reaction scanning damping circuit coupled to said deflection yoke winding and alternating voltage rectifying means connected with the secondary winding of said step-up transformer for developing a unidirectional voltage from energy derived therefrom.

11. Apparatus as defined in claim 10 wherein said alternating voltage rectifying means comprises a vacuum tube rectifier circuit, the vacuum tube rectifier anode being connected with the secondary winding of said auto transformer and wherein said auto transformer includes an auxiliary winding for supplying heater energy for said vacuum tube rectifier.

12. A system for obtaining a voltage of a magnitude suitable for biasing a high voltage accelerating electrode of a cathode ray tube, said system comprising a space discharge device having at least a control electrode, an anode and a cathode, a cathode ray beam deflection device, an auto transformer comprising a primary coil section and a secondary coil section, said anode, said primary coil section and said beam deflection device being included in series circuit, means to apply a potential through said series circuit to said anode, a deflection voltage wave source coupled to said control electrode, and a rectifier having a terminal thereof connected to said secondary coil section, the remaining terminal of said rectifier being available to supply a biasing voltage for a cathode ray tube.

SIMEON I. TOURSHOU.
WILLIAM E. SCULL, JR.

REFERENCES CITED

The following references are of record in the file of this patent:

UNITED STATES PATENTS

| Number | Name | Date |
|---|---|---|
| 2,074,495 | Vance | Mar. 23, 1937 |
| 2,188,647 | Busse | Jan. 30, 1940 |
| 2,223,990 | Holmes | Dec. 3, 1940 |
| 2,265,620 | Bahring | Dec. 9, 1941 |
| 2,397,150 | Lyman | Mar. 26, 1946 |
| 2,440,418 | Tourshou | Apr. 27, 1948 |
| 2,443,030 | Foster | June 8, 1948 |
| 2,470,197 | Torsch | May 17, 1949 |